United States Patent
Marson et al.

(10) Patent No.: US 7,674,512 B2
(45) Date of Patent: Mar. 9, 2010

(54) FILM-BASED CELLULAR MATRIX

(75) Inventors: James Marson, Seattle, WA (US); Lee A. Getzewich, Auburn, WA (US)

(73) Assignee: Cascade Designs, Inc., Seattle, WA (US)

( * ) Notice: Subject to any disclaimer, the term of this patent is extended or adjusted under 35 U.S.C. 154(b) by 826 days.

(21) Appl. No.: 11/150,514

(22) Filed: Jun. 9, 2005

(65) Prior Publication Data
US 2006/0280904 A1 Dec. 14, 2006

Related U.S. Application Data

(63) Continuation of application No. PCT/US03/39259, filed on Dec. 9, 2003.

(60) Provisional application No. 60/432,070, filed on Dec. 9, 2002.

(51) Int. Cl.
*B32B 3/12* (2006.01)
*B32B 7/00* (2006.01)
*B32B 3/00* (2006.01)
*A47C 27/08* (2006.01)
*A47C 17/00* (2006.01)

(52) U.S. Cl. .................. 428/116; 428/118; 428/136; 428/73; 5/705; 5/686

(58) Field of Classification Search .............. 428/116, 428/118, 136, 137, 73, 71, 178, 313.5; 52/793.1; 156/182, 197, 204, 292; 5/714, 706, 665, 5/681, 682, 685, 686, 671, 673; 297/214
See application file for complete search history.

(56) References Cited

U.S. PATENT DOCUMENTS

| | | | |
|---|---|---|---|
| 2,369,006 A * | 2/1945 | Banks .................. | 156/221 |
| 2,575,764 A | 11/1951 | Morner | |
| 3,018,205 A * | 1/1962 | Barut .................. | 428/116 |
| 3,707,009 A * | 12/1972 | Wagner ............... | 428/116 |
| 3,991,245 A | 11/1976 | Jackson | |
| 4,262,045 A | 4/1981 | Cheng et al. | |
| 4,366,608 A | 1/1983 | Nagaoka | |
| 4,485,505 A | 12/1984 | Paul | |
| 4,624,877 A | 11/1986 | Lea et al. | |
| 5,039,567 A | 8/1991 | Landi et al. | |
| 5,106,444 A | 4/1992 | Corley et al. | |
| 5,110,653 A | 5/1992 | Landi | |
| 5,122,405 A | 6/1992 | Landi | |
| 5,137,769 A | 8/1992 | Landi | |
| 5,180,619 A | 1/1993 | Landi et al. | |
| 5,203,607 A | 4/1993 | Landi et al. | |
| 5,289,878 A | 3/1994 | Landi et al. | |

(Continued)

OTHER PUBLICATIONS

International Search Report re PCT application No. PCT/US03/39259 filed Dec. 9, 2003.

*Primary Examiner*—Timothy M Speer
*Assistant Examiner*—Gordon R Baldwin
(74) *Attorney, Agent, or Firm*—Sound Intellectual Property PLLC

(57) ABSTRACT

The invention is directed towards a film-based polymeric cellular matrix, methods for making the polymeric cellular matrix, articles of manufacture incorporating the polymeric matrix and methods for making articles of manufacture. The polymeric cellular matrix is characterized as a plurality of generally identical cells (open-ended geometric prisms) arranged to form a repeating geometric form. The matrix is particularly suited for use as a core between two panels.

21 Claims, 10 Drawing Sheets

U.S. PATENT DOCUMENTS

| | | |
|---|---|---|
| 5,375,305 A | 12/1994 | Stillman |
| 5,427,566 A | 6/1995 | Landi et al. |
| 5,444,881 A | 8/1995 | Landi et al. |
| 5,496,610 A | 3/1996 | Landi et al. |
| 5,509,484 A | 4/1996 | Landi et al. |
| 5,534,343 A | 7/1996 | Landi et al. |
| 5,617,595 A | 4/1997 | Landi et al. |
| 5,701,621 A | 12/1997 | Landi et al. |
| 5,705,252 A | 1/1998 | Lea et al. |
| 5,756,182 A | 5/1998 | Landi et al. |
| 5,840,397 A | 11/1998 | Landi et al. |
| 5,840,400 A | 11/1998 | Landi et al. |
| 6,080,037 A * | 6/2000 | Lee et al. ........................ 450/38 |
| 6,207,256 B1 | 3/2001 | Tashiro |
| 6,415,583 B1 * | 7/2002 | Landi et al. ..................... 54/65 |
| 2004/0036326 A1 * | 2/2004 | Bajic et al. .............. 297/180.14 |

* cited by examiner

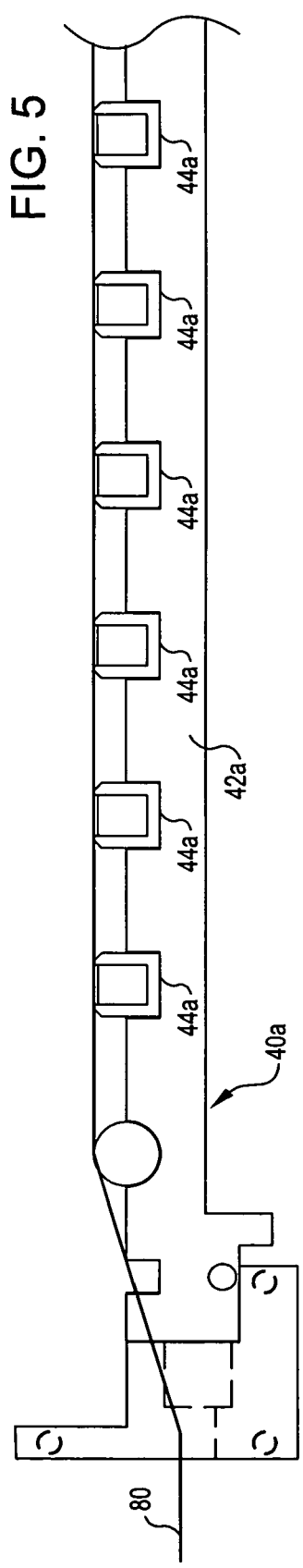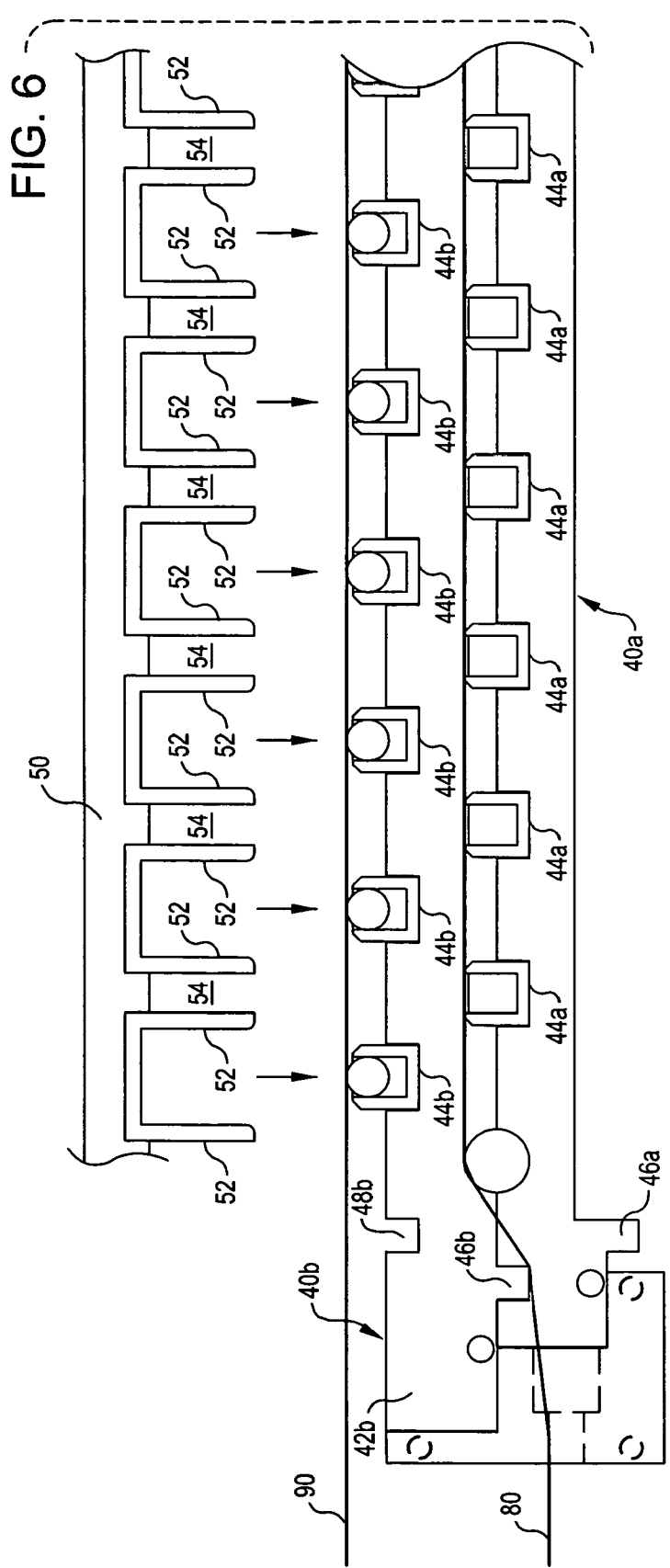

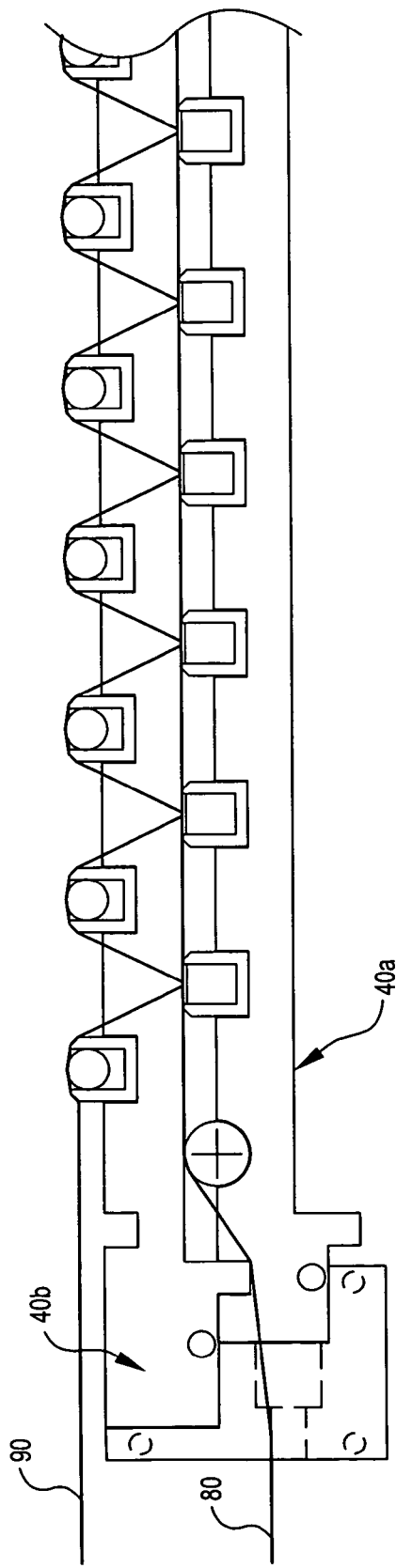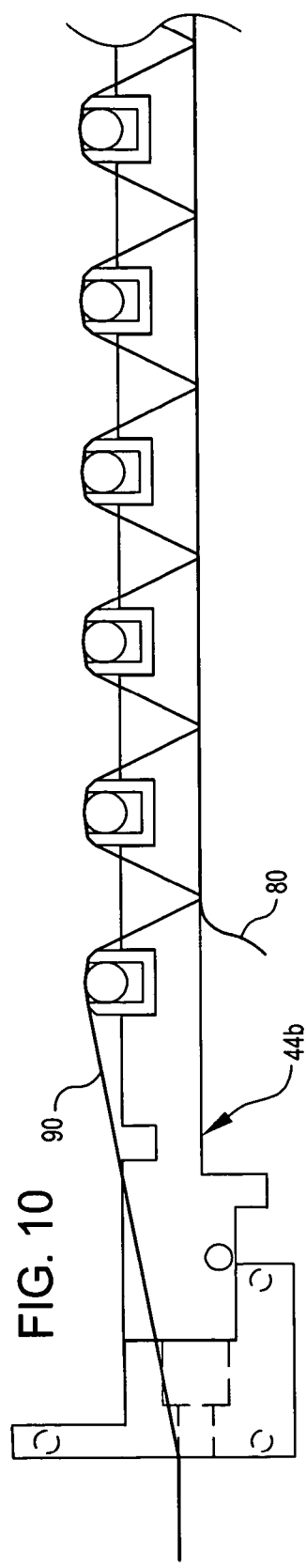

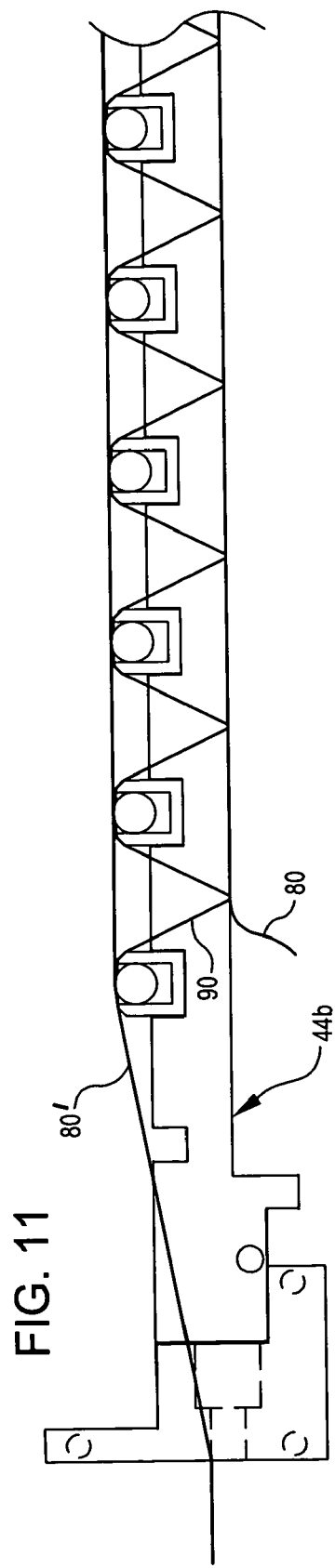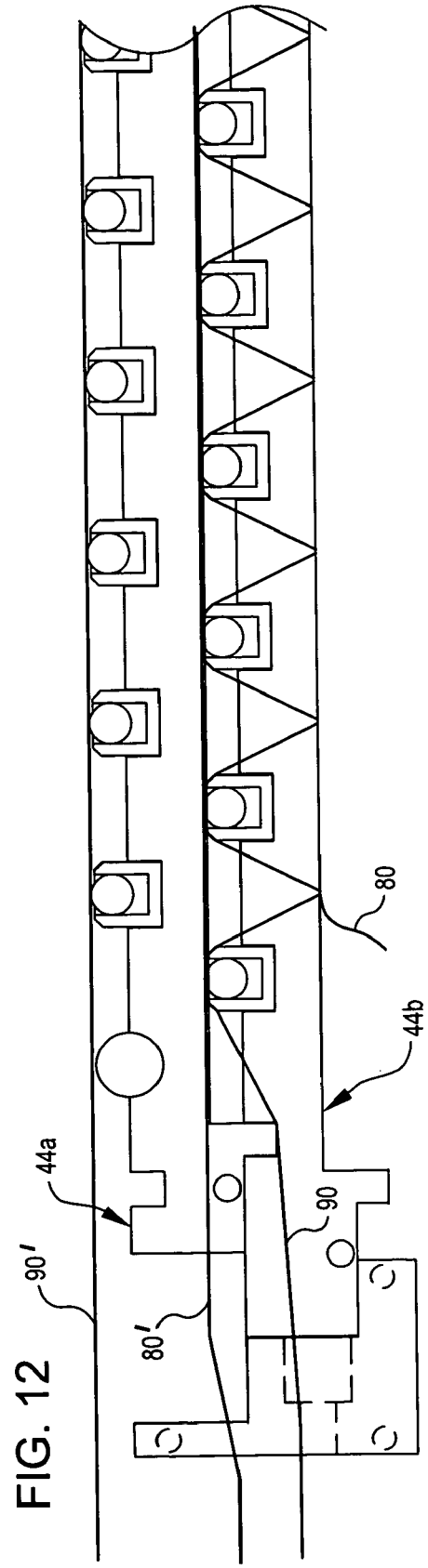

FILM-BASED CELLULAR MATRIX

CROSS-REFERENCE TO RELATED APPLICATION

This is a continuation application that claims benefit, under 35 USC §120, of co-pending international application no. PCT/US03/39259, filed on 9 Dec. 2003, designating the United States, which claims priority benefits under 35 USC §119 to provisional patent application No. 60/432,070, filed 9 Dec. 2002, which applications are incorporated herein by reference.

BACKGROUND OF THE INVENTION

Description of the Prior Art

Cellular bodies find use in a wide variety of applications. In the field of open cell containing bodies, and particularly in the field of self-inflating pads, open cell foam has been the defacto choice for decades. In these applications, a slab of open cell foam is wholly surrounded by and substantially bonded to a fluid impervious envelope that is valved to the environment. While this composition has performed admirably for many years, some applications require extremely lightweight pads that can be extremely compacted for storage.

State of the art efforts to reduce pad density have yielded lightweight pads having a density of 0.8 pounds per cubic foot. An example of such technology can be found in U.S. Pat. No. 5,705,252, which is incorporated herein by reference. While such pads are suitable for nearly all applications, high performance sports enthusiast (who often remove the handle from tooth brushes to reduce pack weight) demand a superior self-inflating pad having even less density without significant sacrifice of insulating values. Attempts to significantly reduce pad densities that rely upon open cell foam cores have failed to produce any significant reduction in density without compromising the nature and integrity of the pad. Thus, an approach using an alternative core technology becomes appealing.

SUMMARY OF THE INVENTION

The invention is directed towards a film-based polymeric cellular matrix, methods for making the polymeric cellular matrix, articles of manufacture incorporating the polymeric cellular matrix and methods for making the articles of manufacture. The polymeric cellular matrix is characterized as a plurality of generally identical cells (open-ended geometric prisms) arranged to form a repeating geometric form. The matrix is particularly suited for use as a core between two panels, preferably sealed about a common perimeter to create a flexible, fluid impervious body.

The matrix comprises a plurality of linear strips of flexible polymeric material selectively arranged and bonded to each other. In selected embodiments, a plurality of substantially equilateral triangular prisms comprises the cellular matrix. Within this group, the triangular prisms may be either registered or non-registered (the meaning of these terms being defined below). In other selected embodiments, a plurality of substantially diamond-shaped prisms comprise the cellular matrix.

The terms "row", "column", "registered" and "non-registered" are used herein. A "row" is defined as laterally repeating geometric forms having perceptible upper and lower boundaries, as shown in the Figures herein. A "column" is defined as geometric forms orthogonal to the direction of a row, as shown in the Figures herein. The term "registered" is used where the shape and orientation of adjacent cells are vertically consistent, i.e., the shape, relative position and orientation of the geometric forms in any given column are substantially the same in each row. The term "non-registered" or "offset" is where every other row of cells are registered, i.e., the shape and orientation of the geometric form in adjacent rows for any given column are not the same, and are usually mirror images thereof. Often, an adjacent row will have its cells laterally shifted by one-half or one cell.

One method of making a first embodiment of the invention broadly comprises a) selectively bonding a first serpentine strip of polymeric material to a first generally linear strip of polymeric material to thereby form a first plurality of open-ended hollow prisms wherein each prism includes an enclosing wall having a plurality of segments, an inner surface and an outer surface, and the first serpentine strip defines a first enclosing wall segment and a second enclosing wall segment of each prism and the first generally linear strip defines a third enclosing wall segment of each prism; b) selectively bonding a second generally linear strip of polymeric material to a portion of the enclosing wall generally opposite the third enclosing wall segment of each prism; and c) selectively bonding a second serpentine strip of polymeric material to the second generally linear strip of polymeric material to thereby form a second plurality of open-ended hollow prisms wherein the second serpentine strip defines a first enclosing wall segment and a second enclosing wall segment of each prism and the second generally linear strip defines a third enclosing wall segment of each prism. Additional linear and serpentine strips are bonded to the forming matrix until a desired number of rows are completed. It is to be appreciated that because the portion of the enclosing wall generally opposite the third enclosing wall segment of each prism for any given row is also the bonding location for a corresponding structure for each prism for an adjacent row, the bonding of each serpentine strip to the generally linear strip can be accomplished in one action.

The resulting matrix can be described as a polymeric matrix of cells comprising a plurality of rows having at least a first type of cell alternating with a second type of cell to form a repeating sequence of geometric prisms that share common lateral sides and that have a generally constant height when in an expanded state. In this embodiment, each subsequent row is non-registered or offset from adjacent rows.

In an alternative embodiment, columns are formed instead of rows. Here, a method of making a second embodiment of the invention broadly comprises a) establishing a first strip of polymeric material having a major axis and a minor axis, and a first side and a second side; b) establishing a second strip of polymeric material having a major axis and a minor axis, and a first side and a second side; c) establishing an adjacent and co-extensive relationship between at least a portion of the two strips; d) bonding the first strip to the second strip at a first location; e) bonding the first strip to the second strip at a second location that is 3n units from the first bonding location; f) bonding the first strip to the second strip at subsequent locations that are 3n units from the immediately prior bonding location; g) establishing a third strip of polymeric material having a major axis and a minor axis, and a first side and a second side; h) establishing an adjacent and co-extensive relationship between at least a portion of the second and third strips; i) bonding the third strip to the second strip at a first location that is 2n units from the first bonding location between the first and second strips; j) bonding the second strip to the third strip at subsequent locations that are 3n units from the immediately prior bonding location; and repeating as is desired.

The resulting matrix can be described as a polymeric matrix of cells comprising a plurality of rows having at least a first type of cell alternating with a second type of cell to form a repeating sequence of geometric prisms that share common lateral sides and that have a generally constant height when in an expanded state. In this embodiment, each subsequent row is registered with respect to adjacent rows, thus for any given column, the geometric prisms are of the same type.

In yet another embodiment, the matrix is formed in situ, that is a three dimensional form of the desired matrix is created simultaneously with formation of the material comprising the matrix. In one variation, a powdered polyurethane is applied to the form and preferably held against the form by electrostatic force. In another variation, a liquid-dispersed thermoplastic polyurethane such as Bayhydrol PR240 from Bayer Corporation is applied to the form. In this variation, the form is then subjected to an approximate 10 minute cure at 300° F., which causes the liquid to evaporate and the polyurethane to adopt the shape of the mold. If the bond between adjacent films is insufficient, in situ spot welding using localized resistive heating elements within the form or other means known in the art can be employed.

The applications for the described cellular matrices are many. To create a sealed envelope wherein the cells reside, the edges of each strip comprising the matrix are substantially bonded to at least one flexible panel of air-impervious material, although preferably two such panels are used wherein the opposing edges of the strips anchor one panel to the other. The perimeter of the at least one panel is then sealed to a second such panel or to an auxiliary structure, so as to create a substantially air-impervious enclosure or envelope. Further disclosure regarding this known technology can be found in U.S. Pat. No. 4,624,877, which is incorporated herein by reference. Preferably, the matrix then operates as tensile elements to resist unfettered expansion of the panel upon pressurization. Because of the resilient nature of the strips, they can also act to displace the panels from each other, thereby achieving a degree of self-expansion.

The bond between the matrix edges and a flexible panel is preferably achieved by coating the panel on one side with a low melting point urethane. Because the matrix is stable when the cellular prisms are on edge, the panel is placed on top of the matrix and caused to slightly compress the matrix during the application of heat and pressure. The heat and slight compression force causes the matrix edges to slightly penetrate into the low melting point urethane coating. Once allowed to cool, the matrix edges are then securely bonded to the flexible panel. Alternatively, the edges of the matrix can possess the low melting point urethane whereby it acts as an adhesive when heated. Those persons skilled in the art will appreciate that a plethora of adhesive and bonding methods can be used both on the panel and/or on the matrix to provide a suitable bond between the two.

In embodiments such as self-inflating air mattresses, modification of the basic envelope described above is necessary. Because of the tendency of the matrix to recover its initial form, i.e., its resiliency, the matrix also operates to at least partially displace the opposing flexible panel portions, thereby providing a level of self-inflation (depending upon the resiliency of the strips comprising the matrix). However, it is necessary that a plurality of holes be formed in the strips comprising the matrix so that each cell has at least one hole or fluid conduit that leads, either directly or via other cells, to a common location. A valve exposed to the environment is then placed at this common location. As a result of this arrangement, air from the environment can migrate into and out of each cell in the matrix when the valve is open depending upon pressure differentials present between the environment and the envelope interior.

The cells defined by the matrix and covering structure, such as fluid impervious flexible panels, can either be filled with a gas such as air, a liquid such as water, or a solid such as down, depending upon the intended purpose of the embodiment. Moreover, because the resulting envelope is preferably constructed from a plurality of opposing panels, it can be formed into numerous articles beyond conventional planar structures. For example, if a hydration reservoir is desired, the panels can be cut to form a wearable vest-like structure wherein water fills the envelope. Because of non-distortion features of the design (the bonded cells act as tension members to substantially maintain the degree of separation between opposing panels regardless of increased internal pressure), the vest-like structure maintains its body contour shape regardless of its fill. Moreover, it prevents "sloshing" due to the baffle effect provided by the cellular matrix. The strips comprising the cellular matrix can also incorporate a biocide additive to reduce contamination problems with water storage. Moreover, the vest-like structure may also be used as a form of a personal floatation device should it be filled with air, or as insulating apparel if filled with a material such as down (it can be inflated to increase loft when higher insulating properties are desired).

BRIEF DESCRIPTION OF THE DRAWINGS

FIG. 5 is a detailed partial elevation view of a first rack having a first film strip extending over a plurality of finger members;

FIG. 6 is a detailed partial elevation view of a second rack placed above the first rack having a second film strip extending over a plurality of finger members and a corrugation rack poised to extend into the interstitial areas between the second rack finger members;

FIG. 9 illustrates the resulting structure of the first and second film strips after removal of the welding rack and the corrugation rack shown in FIG. 8;

FIG. 10 shows the resulting structure of the first and second film strips after removal of the first rack shown in FIG. 9;

FIG. 11 is a detailed partial elevation view of the second rack after a third film strip is placed over the top of the finger members;

FIG. 12 shows the configuration of FIG. 11 after the first rack is placed above the second rack having a fourth film strip extending over the plurality of finger members;

DESCRIPTION OF THE PREFERRED EMBODIMENTS

The following discussion is presented to enable a person skilled in the art to make and use the invention. Various modifications to the preferred embodiments will be readily apparent to those skilled in the art, and the generic principles herein may be applied to other embodiments and applications without departing from the spirit and scope of the present invention as defined by the appended claims. Thus, the present invention is not intended to be limited to the embodiments show, but is to be accorded the widest scope consistent with the principles and features disclosed herein.

Figure 1:
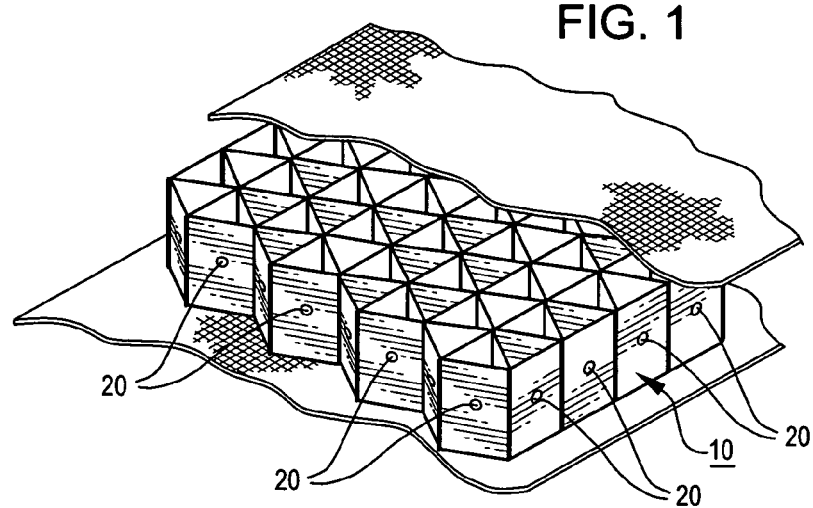
FIG. 1 is a perspective view of a first embodiment of the invention shown in conjunction with two flexible panels in partial cut-away.
Figure 2:
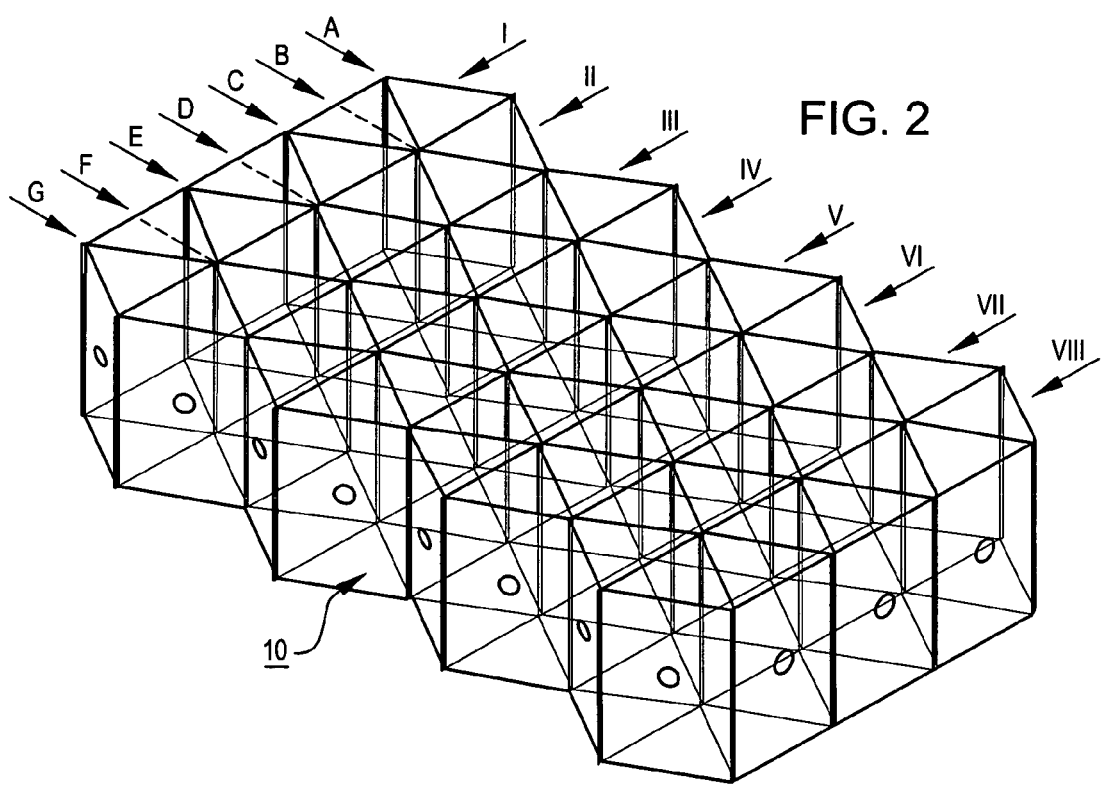
FIG. 2 is a perspective view of the first embodiment.
Figure 3:
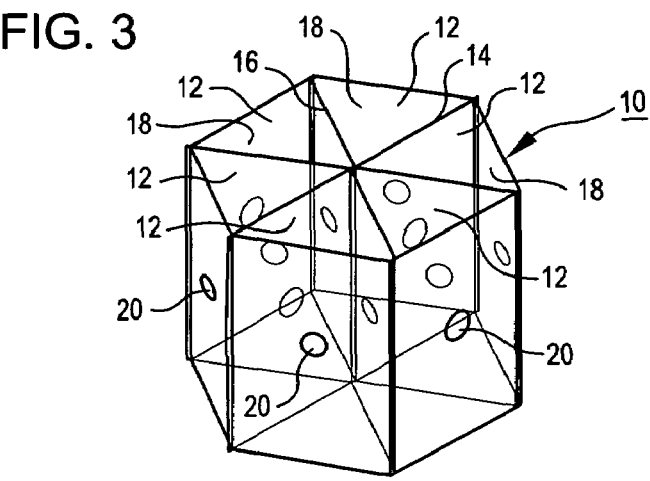
FIG. 3 is a detailed perspective view of a cluster of cells illustrating the intercellular communication via holes formed in the strips of film.

Turning then to the several figures wherein like numerals indicate like parts, and more particularly to FIGS. 1-3, a first matrix embodiment of the invention is shown. In any embodiment described herein, a preferred material for construction comprises a high melting point polyether urethane film formed into strips of approximately 12 or 24 inches in width (for clarity, the illustrated matrices are shown having a width of about 3 inches). Because the ultimate width of a matrix will vary depending upon application, forming a matrix in this range of widths will permit later cutting into a desired form factor, and thus reduce creation time. While application criteria will largely determine the thickness of the film, the illustrated embodiments use film having a thickness of approximately 1.5 to 3.0 mils. Depending upon the ultimate application of a given matrix, the film may also comprise a biocide additive, define a plurality of holes, possess low melt properties on the edges of the strip, contain lateral impregnated tensile elements, and the like.

As will be described in more detail below, the embodiment of FIGS. 1-3 is intended to be used as a core for an inflatable article. As such, it is preferable that each cell in the matrix be able to fluidly communicate either directly or indirectly with each adjacent cell. Consequently, each cell wall preferably has at least one hole formed therein. While the diameter or area of the hole(s) is mostly a design consideration, hole diameters of about 0.325 inches per side is considered to be satisfactory in view of the described preferred dimensions.

As shown in FIGS. 1-3, a plurality of equilateral triangular prisms forms cells 12. Each cell 12 has three sides: leg 14, leg 16 and base 18. Because each cell is single sided, each leg 14 and 16 and each base 18 serve two cells. Thus, while the description is presented with respect to one cell, it is to be understood that adjacent cells are also affected.

From inspection of the several cells 12, it can be observed that matrix 10 is comprised of repeating rows of cells. In FIG. 2, these rows are labeled I, II, III, IV, V, VI, VII and VIII. It can also be observed that matrix 10 is comprised of repeating columns. In FIG. 2, these columns are labeled A, B, C, D, E, F and G. However, in this embodiment, the columns are non-registered or offset so that for any given column, a cell in a vertically adjacent row is the mirror image of that cell.

For simplicity, only exteriorly facing holes 20 are shown, however it is to be understood that all cells should be in fluid communication with every adjacent cell. The holes may be preformed in the strips or may be created after completion of the matrix by collapsing the matrix and cutting or melting suitable holes. A detailed view of a cluster of cells is shown in FIG. 3 wherein each leg 14 and 16, and each base 18 has a hole 20 formed therein.

Construction of matrix 10 is best understood by referring to FIGS. 4-15. Apparatus 30 shown in FIG. 4 comprises frame 32, which provides suitable support for racks 44a and 44b, corrugation rack 50 and welding rack 60. It also provides suitable support for film rolls 36a and 36b. Also shown are registration bars 70a and 70b, and spacers 72. As will be described in greater detail below, registration bars 70a and 70b in conjunction with spacers 72 maintain the integrity of matrix 10 both during construction as well as during subsequent manipulation.

Turning to FIG. 5, rack 40a is shown accepting first or base film segment 80 from film roll 36a. Rack 40a comprises horizontal support member 42, which includes a plurality of finger members 44a. In FIG. 6, rack 40b, which is very similar to rack 40a, is placed above but laterally offset from rack 40a. Registration tabs 46a and 46b, and registration slots 48a and 48b ensure the proper degree of lateral offset. In all other significant respects, rack 40b is similar to rack 40a, e.g., the finger members are the same as is the spacing between finger members. Second or serpentine film segment 90 is then placed over finger members 44b. Corrugation rack 50 is then urged towards racks 40a and 40b with the result being shown in FIG. 7.

Figure 7:
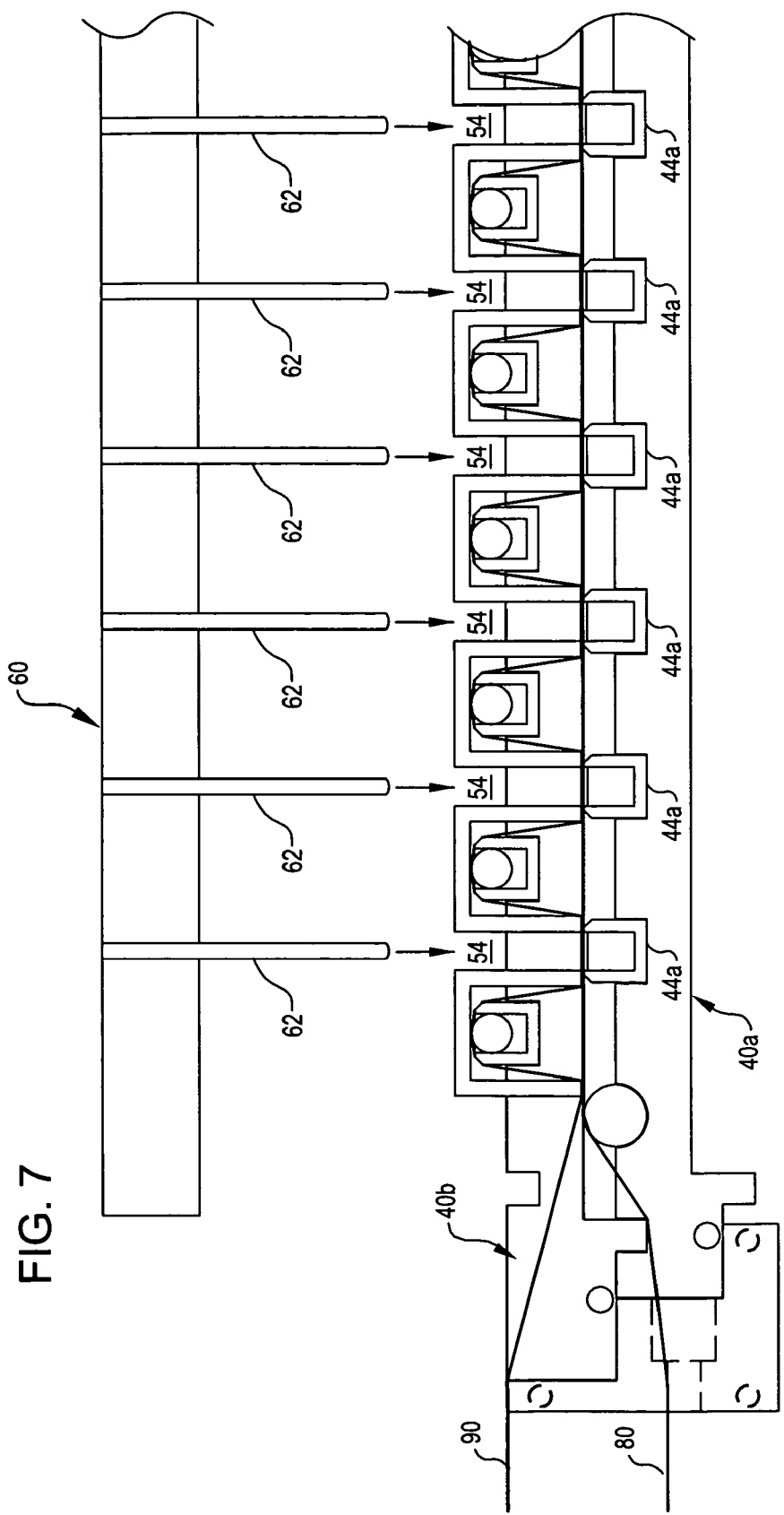
FIG. 7 shows the configuration of FIG. 6 wherein the corrugation rack has caused the second film strip to serpentine about the finger members of the second rack, and a welding rack poised to extend into the interstitial areas between the corrugation rack elements.

As shown in FIG. 7, corrugation rack 50 causes serpentine film segment 90 to conform around each finger member 44b. Thus, it is considered desirable to provide low friction surfaces both at finger members 44b (and similarly finger members 44a) and corrugation rack legs 52, so that sufficient additional film can be spooled from roll 36b. In addition or alternatively, corrugated rack 50 can be extended towards finger members 44b in a progressive manner from one side to the other, e.g., from right to left in FIG. 4. In this manner, friction is substantially reduced since film 90 remains generally linear and in light contact with finger members to the left of the engagement location. FIG. 7 also shows welding rack 60 positioned over the described assembly. Welding rack 60 includes fins 62, which are heated to above the melting point for the films present in rolls 36a and 36b.

Figure 8:
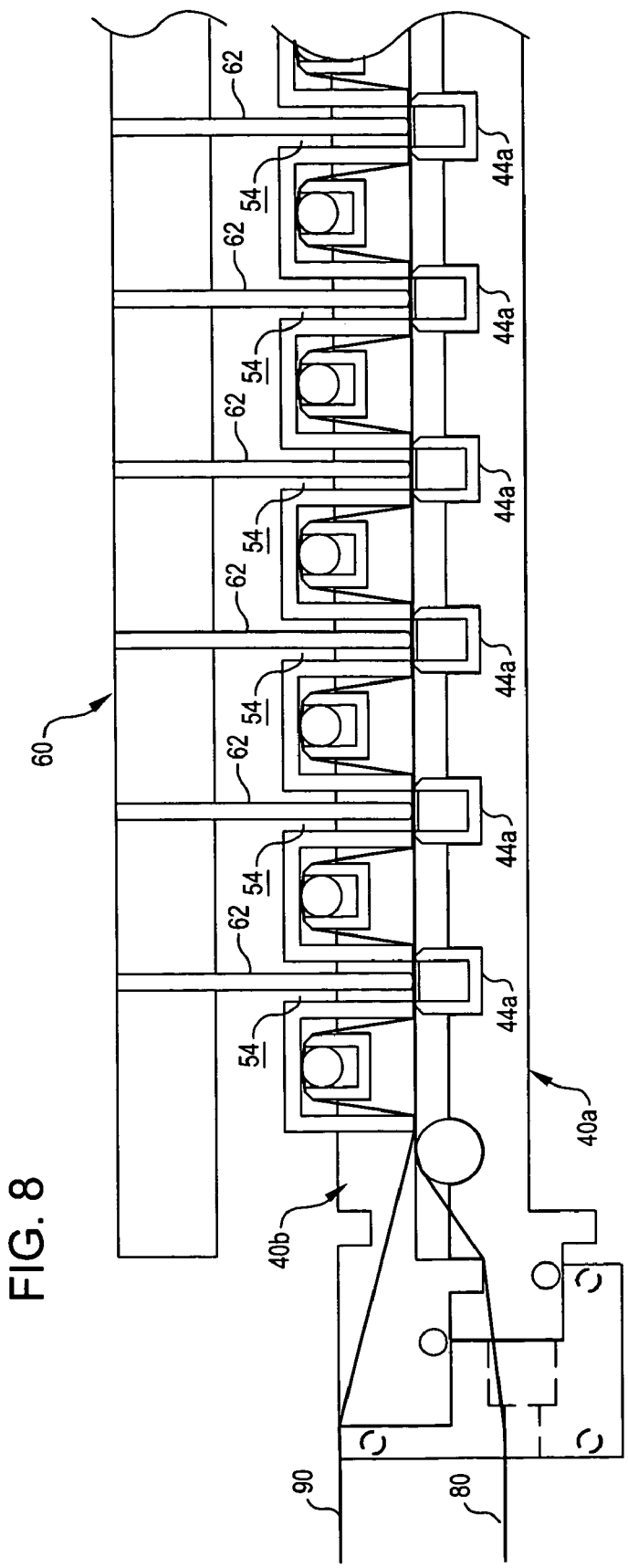
FIG. 8 shows the configuration of FIG. 7 wherein the welding rack has compressed the second film strip into the first film strip and welded the two together wherein the first rack finger members provide a backing surface for the two film strips.

When welding rack fins 62 are extended into gaps 54 between corrugation rack legs 52 and compressively contact finger members 44a as shown in FIG. 8, films 80 and 90 are welded together. While the duration of contact and the temperature of fins 62 depend upon the nature of the materials used (composition and thickness being two primary aspects), it is only necessary to achieve a secure melting bond between the two films.

After completion of welding, welding rack 60 and corrugation rack 50 are removed, with the resulting structure being illustrated in FIG. 9. Because no further welds are to be performed on film 80, rack 44a is removed and rack 44b is moved down and shifted left; the resulting arrangement is shown in FIG. 10. As shown therein, a first row of cells has been created.

Figure 13:
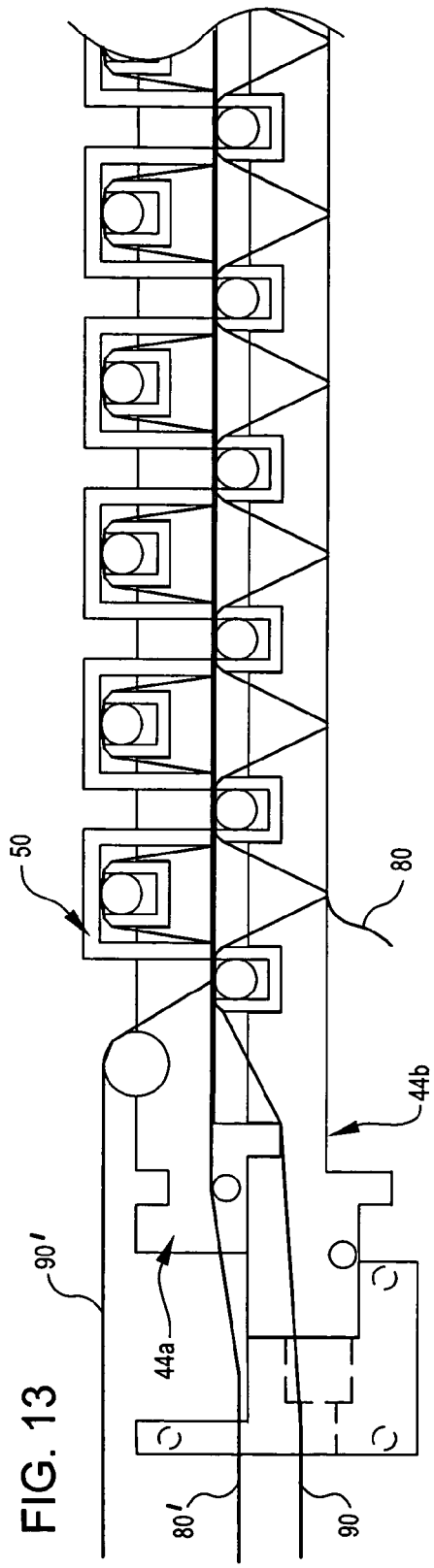
FIG. 13 shows the configuration of FIG. 12 with the addition of the corrugation rack extending into the interstitial areas between the first rack finger members.

To establish a second row of cells, second base film segment 80' is presented to the top of the cell apexes comprising the first row. If welded thereto at this juncture, there would be two established rows of cells. However and as is shown in FIG. 12, the process is repeated to form a third row of cells. As shown, rack 40a is mated to rack 40b, and second serpentine film 90' is placed there over. From a functional position, this arrangement is very similar to that shown in FIG. 6. Once in position, corrugation rack 50 is brought to bear against second serpentine film 90' as is illustrated in FIG. 13. In so doing, second serpentine film 90' conforms around finger members 44a to create a serpentine geometry, and eventually legs for a new row of cells.

Figure 14:
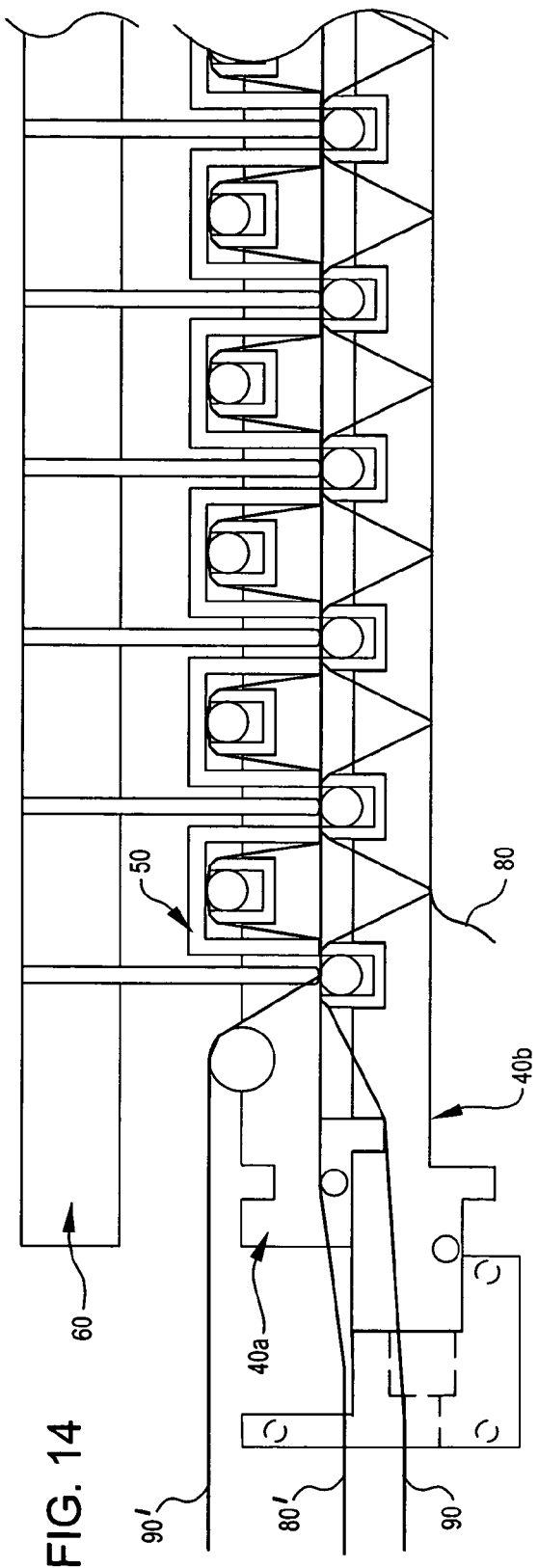
FIG. 14 shows the configuration of FIG. 13 wherein the welding rack has compressed the second, third and fourth film strips wherein the second rack finger members provide a backing surface for the three film strips.
Figure 15:
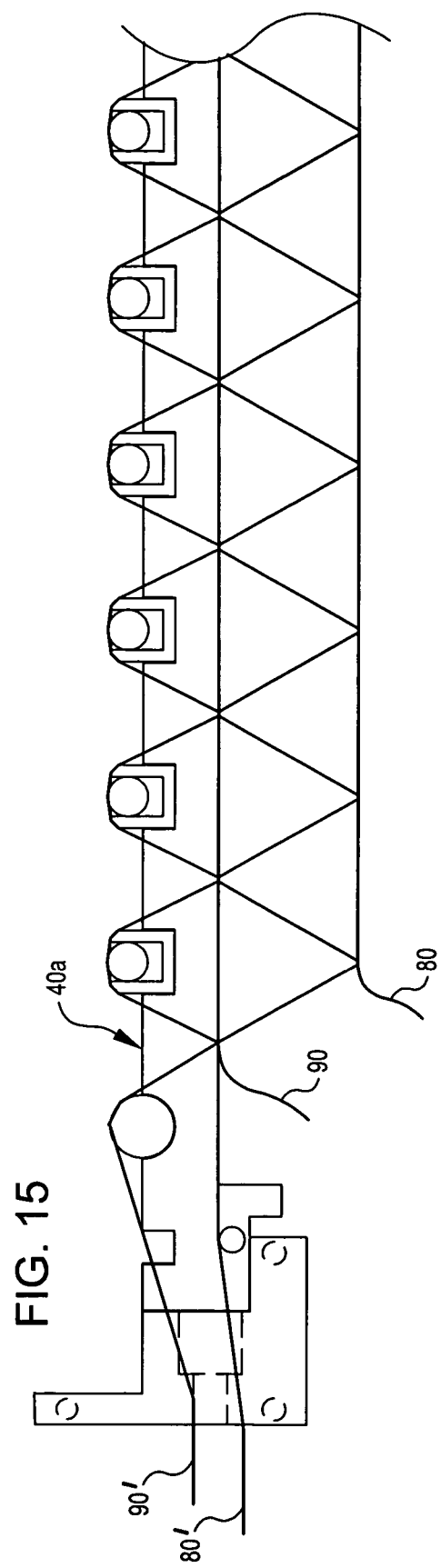
FIG. 15 illustrates the resulting intermediate process cellular matrix after removal of the second rack, the corrugation rack and welding rack.

Again, welding rack fins 62 are compressively brought to bear against second serpentine film 90', which in turn compresses second base film 80' and second film 90 against finger members 44b, as is shown in FIG. 14. Once a suitable weld there between has been established, welding rack 60 and corrugation rack 50 are removed, as well as second rack 40b, as is shown in FIG. 15. In this manner, a second, partially compete row of cells has been created. This process (FIGS. 11-15) is repeated until the desired number of cells has been created. For applications relating to inflatable air mattresses, a preferred length is about 80 inches.

Figure 4:
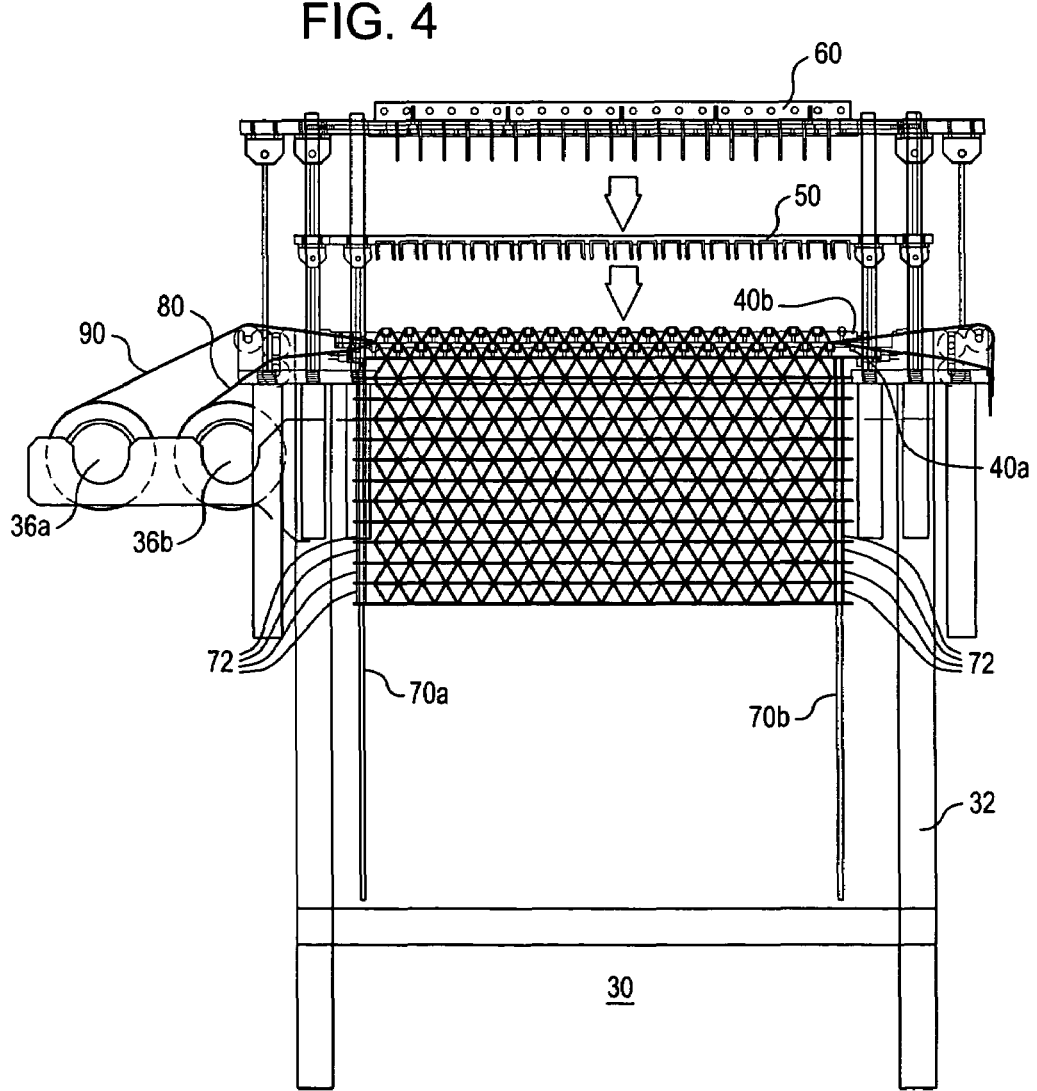
FIG. 4 is a plan view of an apparatus form making a cellular matrix according to the first embodiment.

In order to maintain registry and facilitate handling of the resultant matrix, the ends of each strip are impaled over rods 70a and 70 as is shown in FIG. 4. Spacers 72 provide uniform spacing between rows of cells. Once the matrix is completed, it may be handled with ease by using rods 70a and 70b, such as when placing the matrix between two flexible panels for subsequent bonding, as is shown in FIG. 1.

Figure 16:
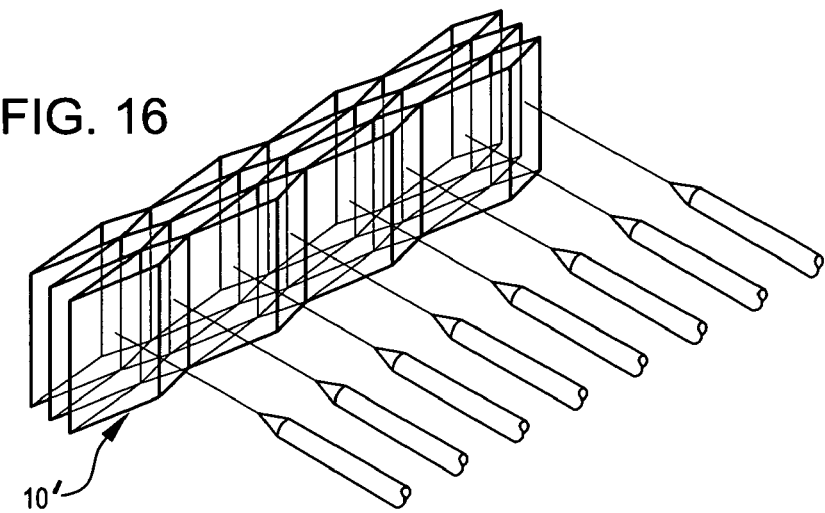
FIG. 16 is a perspective view of a second embodiment of the invention wherein the cells are registered and a plurality of holes are formed by puncturing.
Figure 17:
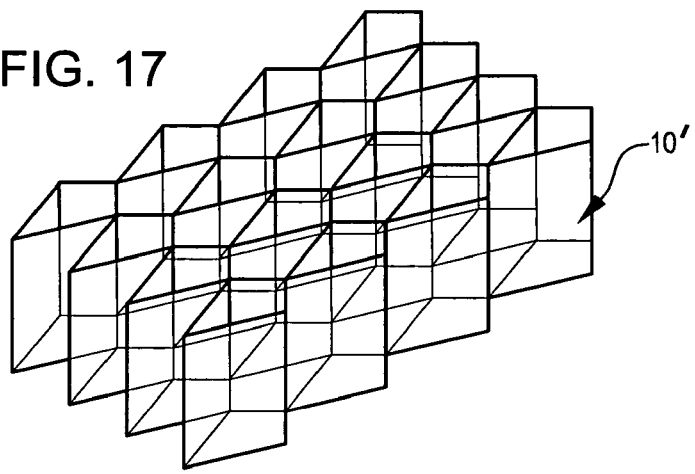
FIG. 17 shows a partially expanded state of the embodiment of FIG. 16.
Figure 18:
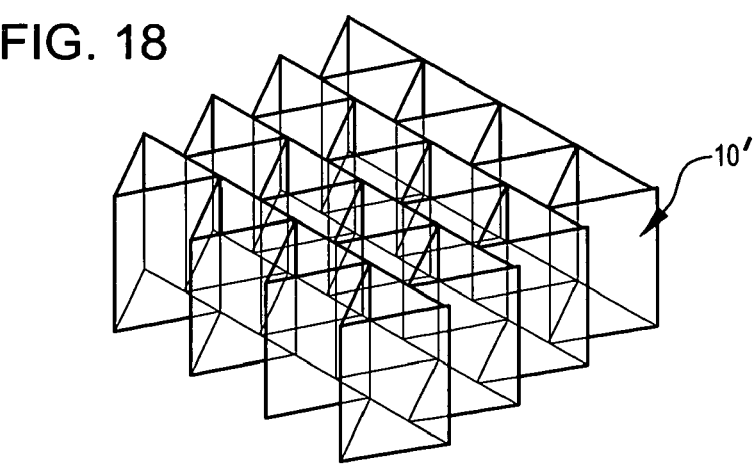
FIG. 18 shows a fully expanded state of the embodiment of FIG. 16.

The prior discussion related to the formation of a non-registered matrix using a combination of linear and serpentine strips of urethane. FIGS. 16-18 illustrate the form of registered matrix 10' using stacked linear strips of urethane in conjunction with selected bonding. In this embodiment, a plurality of evenly spaced bonds are created between two strips of material. A third strip is bonded to one of the first two strips also using the same bonding distance, however the locations of the bonds are offset by approximately ⅔ of the first bonding distance. A fourth strip is then bonded to the third strip using the same bonding distance and in substantial registry with the first bonds. The resulting form is best shown in FIG. 16, which upon expansion, results in the configuration illustrated in FIG. 17. For purposes of clarity, holes in matrix 10' are not shown.

What is claimed:

1. A collapsible polymeric matrix of single-walled cells comprising:
   a first row of film-based, open-ended hollow prisms, each prism having a perimeter enclosing wall that includes a plurality of wall segments, the first row having at least a first type of prism alternating with a second type of prism to form a repeating sequence of prisms wherein each prism in the row shares a common enclosing wall segment with a directly adjacent prism; and
   a second row of film-based, open-ended hollow prisms, each prism having a perimeter enclosing wall that includes a plurality of wall segments, the second row having at least the first type of prism alternating with the second type of prism to form a repeating sequence of prisms, wherein each prism in the row shares a common enclosing wall segment with a directly adjacent prism, wherein each row has a generally constant upper and lower boundary and wherein no row overlaps another row, when the matrix is in an expanded state, wherein each wall segment of each prism defines an orifice to establish fluid communication with an adjacent prism.

2. The matrix of claim 1 wherein the matrix is registered.

3. The matrix of claim 1 wherein the matrix is non-registered.

4. The matrix of claim 1 wherein the perimeter enclosing wall of each row of open-ended prisms comprises a first edge and a second edge, and wherein the matrix further comprises a flexible panel having a first major surface and a second major surface, the first major surface being substantially bonded to the first edges, thereby establishing an additional wall for substantially each prism to which the panel is bonded.

5. The matrix of claim 4 further comprising a second flexible panel having a first major surface and a second major surface, the first major surface of the second flexible panel being substantially bonded to the second edges, thereby establishing an additional wall for substantially each prism to which the second panel is bonded.

6. The matrix of claim 5 wherein the first and second flexible panels include perimeter portions and wherein the perimeter portions are sealingly joined to each other in opposition, thereby creating a fluid impervious envelope wholly surrounding the cellular matrix, and further comprising a valve for permitting fluid ingress and egress between the environment and the matrix.

7. The matrix of claim 6 wherein the resulting article is one of a fluid inflatable mattress, a fluid inflatable vest, a fluid inflatable personal hydration container, or a fluid inflatable seat cushion.

8. The matrix of claim 1 further comprising a biocide integrated there into.

9. The matrix of claim 1 wherein the perimeter enclosing wall of each row of open-ended prisms comprises a first edge and a second edge, and wherein each edge further comprises a component having a lower melting point than the portion of the wall between the edges.

10. The matrix of claim 7 further comprising a biocide integrated into the matrix.

11. The matrix of claim 7 wherein the perimeter enclosing wall of each row of open-ended prisms comprises a first edge and a second edge, and wherein each edge further comprises a component having a lower melting point than the portion of the wall between the edges.

12. A collapsible polymeric matrix of single-walled cells comprising:
   a first row of film-based, open-ended hollow prisms, each prism having a perimeter enclosing wall that includes a plurality of wall segments, the first row having at least a first type of prism alternating with a second type of prism to form a repeating sequence of prisms wherein each prism in the row shares a common enclosing wall segment with a directly adjacent prism; and
   a second row of film-based, open-ended hollow prisms, each prism having a perimeter enclosing wall that includes a plurality of wall segments, the second row having at least the first type of prism alternating with the second type of prism to form a repeating sequence of prisms, wherein each prism in the row shares a common enclosing wall segment with a directly adjacent prism, wherein each row has a generally constant upper and lower boundary, wherein no row overlaps another row, when the matrix is in an expanded state, and wherein at least one wall of each prism defines an orifice to establish fluid communication with an adjacent prism.

13. The matrix of claim 12 wherein the matrix is registered.

14. The matrix of claim 12 wherein the matrix is non-registered.

15. The matrix of claim 12 wherein the perimeter enclosing wall of each row of open-ended prisms comprises a first edge and a second edge, and wherein the matrix further comprises a flexible panel having a first major surface and a second major surface, the first major surface being substantially bonded to the first edges, thereby establishing an additional wall for substantially each prism to which the panel is bonded.

16. The matrix of claim 15 further comprising a second flexible panel having a first major surface and a second major surface, the first major surface of the second flexible panel being substantially bonded to the second edges, thereby establishing an additional wall for substantially each prism to which the second panel is bonded.

17. The matrix of claim 16 wherein the first and second flexible panels include perimeter portions and wherein the perimeter portions are sealingly joined to each other in opposition, thereby creating a fluid impervious envelope wholly surrounding the cellular matrix, and further comprising a valve for permitting fluid ingress and egress between the environment and the matrix.

18. The matrix of claim 12 wherein the resulting article is one of a fluid inflatable mattress, a fluid inflatable vest, a fluid inflatable personal hydration container, or a fluid inflatable seat cushion.

19. The matrix of claim 18 further comprising a biocide integrated into the matrix.

20. The matrix of claim 12 wherein the perimeter enclosing wall of each row of open-ended prisms comprises a first edge and a second edge, and wherein each edge further comprises a component having a lower melting point than the portion of the wall between the edges.

21. The matrix of claim 18 wherein the perimeter enclosing wall of each row of open-ended prisms comprises a first edge and a second edge, and wherein each edge further comprises a component having a lower melting point than the portion of the wall between the edges.

* * * * *